UNITED STATES PATENT OFFICE.

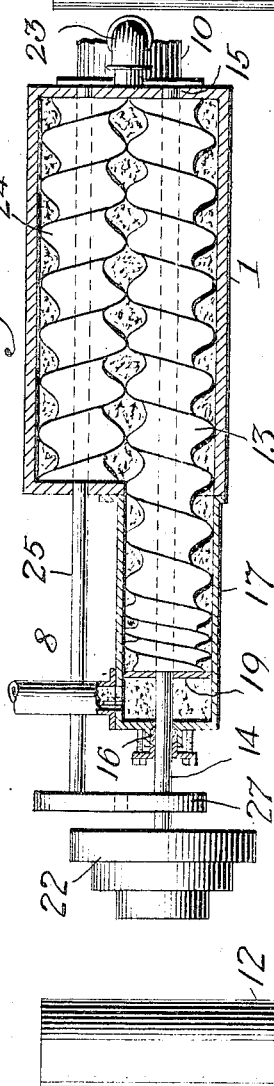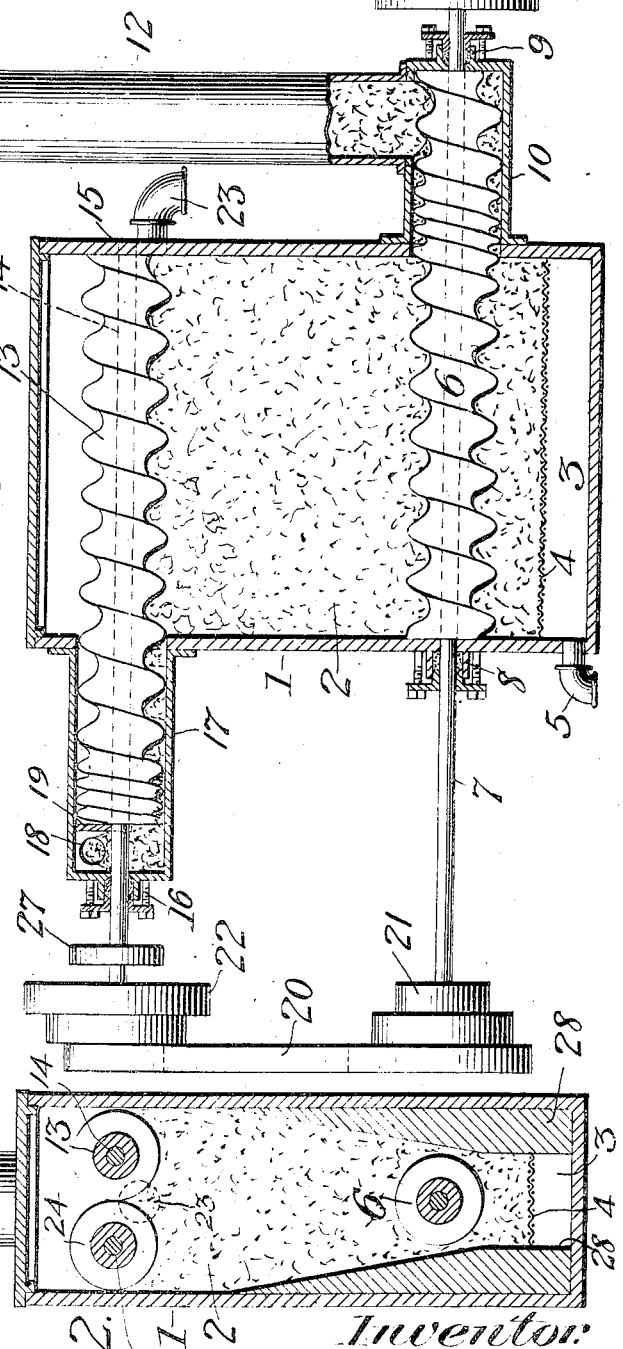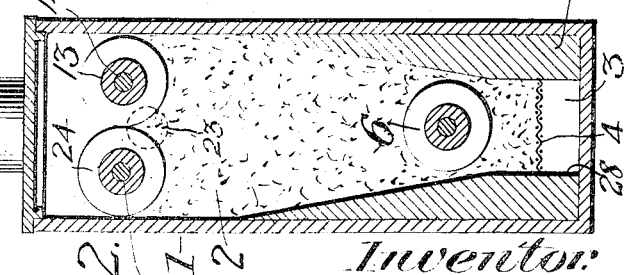

ARTHUR PHILIP STITZEL, OF LOUISVILLE, KENTUCKY.

CONTINUOUS FILTER.

981,031.

Specification of Letters Patent.  Patented Jan. 10, 1911.

Application filed August 8, 1910. Serial No. 576,197.

*To all whom it may concern:*

Be it known that I, ARTHUR PHILIP STITZEL, a citizen of the United States, residing at Louisville, in the county of Jefferson and State of Kentucky, have invented a certain new and useful Improvement in Continuous Filters, of which the following is a full, clear, and exact description.

The object of this invention is to provide for the removal of filtering material as it becomes wasted and clogged during the progress of the filtering operation, and to replace it with fresh filtering material continuously or periodically as may be required, so that the filter becomes, in fact, continuous in its operation.

The invention consists of a suitable vessel containing a filter-bed having one or more mediums arranged at its surface and adapted to remove the wasted and clogged filtering material contained in said bed, and one or more conveyers properly arranged to introduce fresh filtering material to replace the wastage removed as first mentioned, so that the apparatus may be operated as a continuous filter.

In the accompanying drawings, illustrating the invention, in the several figures of which like parts are similarly designated, Figure 1 is a partly sectional elevation of an apparatus embodying the principle of the invention. Fig. 2 is a cross-section, and Fig. 3 is a top plan view, partly in section.

Without thereby limiting the invention to mere details of construction and the arrangement, relative and otherwise, of the parts, I will proceed to describe the invention as shown, and then will particularly point out and distinctly claim the part, improvement or combination which I claim as my invention.

The filter may comprise an upright rectangular tank or vessel 1, suitably mounted and adapted to contain in a leak-tight manner, any suitable filtering material 2, which is capable of clarifying or otherwise affecting the fluid to be filtered. In the bottom of the tank is reserved a space 3, for receiving the filtrate, and this space is separated from the filtering material by a suitable screen 4 and has an outlet 5 for the filtered material. Arranged transversely near the bottom of the tank is a conveyer or other feeding device 6, here shown as a screw-conveyer, mounted upon a shaft 7 which has a bearing 8 in one end of the tank and another bearing 9 in the outer end of a lateral extension 10 of the tank; and beyond this extension said shaft may be provided with a driving pulley 11. The screw conveyer has its grooves of substantially uniform width and depth from one side of the tank to the other, but within the extension 10 the grooves may be of varying width and depth from the inlet end to the admission side of the tank.

Erected upon the extension 10 is a filter reservoir or chute 12, for supplying the filtering material, and from which such material is forced into the filter-bed by the screw conveyer 6 displacing said bed upwardly and thereby replacing any surface filtering material that is or contains wastage. The reduction in size of the grooves in the conveyer retards the volume of inflow of filtering material, so as to admit the fresh filtering material in quantities proportionate to the quantities removed as wastage.

At the top of the filter-bed is arranged another screw conveyer 13, mounted on the shaft 14, which shaft has a bearing 15, of any suitable construction, in one end of the tank and a bearing 16 at its outer end in lateral extension 17 on the opposite side of the tank. The conveyer 13 has its grooves of substantially the same width and depth from the inlet side of the tank to nearly the discharge end, and then at this discharge end the grooves are made narrower and shallower so as to regulate the ultimate discharge of wastage. The discharge is effected through the pipe 18 which may be suitably located at any desired point in the lateral extension 17 and is preferably located at the side of this extension above the axis of the screw conveyer and separated from the screw conveyer by means of the wall or baffle 19.

The shafts 7 and 14 may be connected by a band 20 arranged over differential pulleys 21 and 22 on these shafts respectively, or the conveyers may be otherwise driven as desired and as the exigencies of the work may require.

The fluid to be filtered is admitted through the pipe 23 preferably arranged at one side of the tank, and just below the axis of the upper conveyer. By admitting the fluid to be filtered substantially below the axis of the discharge conveyer, there is an air cushion produced above the shaft of the discharge conveyer which admits of the discharge conveyer doing its work in a very efficient manner. Now, it will be understood that as the fluid is filtered by percolation through the filter bed, the upper portion of the bed becomes foul or clogged, and it is highly desirable to remove such wastage as it accumulates; but to do this successfully and at the same time maintain the filter bed at a proper height and fresh and clean, there must be some provision for replacing the wastage by fresh filtering material. By the arrangement shown, as the wastage is removed by the screw conveyer or discharge device 13, fresh filtering material is introduced from the reservoir 12, through the conveyer 6, and this may be done without any interruption in the process of filtration, and thus the fluid to be filtered will be passing through a relatively fresh body of filtering material at all times.

The conveyers may be driven periodically, or continuously, and at the same or different speeds.

Any suitable provision may be made for cutting off the supply of filtering material from the reservoir.

If the top of the filter-bed is of larger area than the bottom, the removal of the wastage may be facilitated by duplicating the discharge conveyer, as indicated at 24 in Figs. 2 and 3, and the shaft 25 of this auxiliary discharge conveyer may be extended outside of the tank to a point where it may be driven from the shaft 14 of the conveyer 13, as by a belt 27. In this case it might be well to reduce the transverse section of the tank adjacent to the lower inlet conveyer by means of the filler pieces 28.

When a pair of screw conveyers is used for discharging the wastage, it is better to have the conveyers of opposite pitch, so that the screw that is wholly within the tank may serve to draw back any excess carried by the primary discharge screw, and in that way the top of the filter-bed will be kept practically even and there will be prevented an excess accumulation at the discharge end. Moreover, this arrangement also provides a continuous movement of the fluid to be filtered from end to end and across the top of the filter bed.

I have not shown the details of valves, stuffing-boxes, and similar mechanical accessories that may be needful or advisable, but these will be supplied in accordance with the necessity of each individual installation of filter.

As already sufficiently indicated, the invention is not limited to details of construction or mere arrangement and number of parts. Where convenient or necessary, the conveyers may be in pairs or other number. By the term "conveyer", I do not mean to limit the invention to screw conveyers or any other particular kind of moving device; but it is sufficient if the respective conveyers at top and bottom are capable of removing and discharging the waste, and introducing fresh filtering material.

What I claim is:—

1. In a filter, the combination with a filter-bed from which the wastage is to be removed, of a forcing medium for forcibly replenishing the filter-bed as the wastage therefrom is removed.

2. In a filter, the combination of a filter-bed, means to remove wastage from the top thereof and means to replenish the filter-bed from the bottom.

3. In a continuous filter, the combination with a filter-bed, of a bed-replenishing conveyer operating across the bottom of the bed.

4. In a continuous filter, the combination with a filter-bed, of a conveyer operating across the top of the bed and adapted to remove and discharge the wastage, and a bed-replenishing conveyer operating across the bottom of the bed.

5. In a continuous filter, the combination with a filter-bed, of a pair of screw conveyers operating across the top of the bed and adapted to remove and discharge the wastage, and a bed-replenishing conveyer operating across the bottom of the bed.

6. In a continuous filter, the combination with a filter-bed, of several screw conveyers pitched in opposite directions and arranged across the top of the bed and adapted to remove and discharge the wastage, and a bed-replenishing conveyer operating across the bottom of the bed.

7. In a continuous filter, the combination with a filter-bed, of a conveyer operating across the top of the bed and adapted to remove and discharge the wastage, and a bed-replenishing conveyer operating across the bottom of the bed, and means to connect said screw conveyers coöperatively.

8. In a filter, the combination with a tank containing a filter-bed, and means for replenishing the filter-bed comprising a filtering material reservoir, and a screw conveyer on to which said reservoir discharges its contents and by which said contents are introduced into the tank and thereby distributed in said tank.

9. In a filter, the combination with a tank containing a filter-bed, means to remove the wastage from the top of said bed, and means for replenishing the filter-bed comprising a filtering material reservoir, and a screw conveyer on to which said reservoir discharges its contents and by which said contents are introduced into the tank and thereby distributed in said tank.

10. In a filter, the combination with a tank containing a filter-bed, a wastage collecting and discharging device located at the top of the bed, and means for replenishing the filter bed comprising a filtering material reservoir, and a screw conveyer on to which said reservoir discharges its contents and by which said contents are introduced into the tank and thereby distributed in said tank.

11. In a filter, the combination with a tank containing a filter-bed, a screw conveyer at the top of the bed for collecting and discharging the wastage, an inlet for the fluid to be filtered located below the axis of the discharge conveyer and at one end thereof, and means for replenishing the the filter-bed comprising a filtering material reservoir, and a screw-conveyer on to which said reservoir discharges its contents and by which said contents are introduced into the tank and thereby distributed in said tank.

12. In a filter, the combination with a tank containing a filter-bed, a screw conveyer at the top of the bed for collecting and discharging the wastage, an inlet for the fluid to be filtered located below the axis of the discharge conveyer and at one end thereof, and means for replenishing the filter-bed comprising a filtering material reservoir, and a screw conveyer on to which said reservoir discharges its contents and by which said contents are introduced into the tank and thereby distributed in said tank, and a chamber for receiving and discharging the filtered fluid located at the bottom of the filter-bed within the tank and screened from said bed.

13. In a filter, the combination with a tank containing a filter-bed and provided with a supply and a discharge for the filtering material, of conveyers for respectively replenishing and discharging the filtering material at the supply and discharge of said tank.

In testimony whereof I have hereunto set my hand this 6th day of August A. D. 1910.

ARTHUR PHILIP STITZEL.

Witnesses:
MARY HURST,
MARGUERITE J. JAMES.